United States Patent
Noguchi (10) Patent No.: US 7,084,523 B2
(45) Date of Patent: Aug. 1, 2006

(54) WINDMILL FOR WIND POWER GENERATION

(76) Inventor: Tsuneo Noguchi, abankohto-Minamikarasuyama 301, 24-20, Minamikarasuyama 6-chome, Setagaya-ku, Tokyo (JP) 157-0062

( * ) Notice: Subject to any disclaimer, the term of this patent is extended or adjusted under 35 U.S.C. 154(b) by 45 days.

(21) Appl. No.: 10/505,451

(22) PCT Filed: Sep. 19, 2003

(86) PCT No.: PCT/JP03/12031

§ 371 (c)(1),
(2), (4) Date: Sep. 1, 2004

(87) PCT Pub. No.: WO2004/027259

PCT Pub. Date: Apr. 1, 2004

(65) Prior Publication Data

US 2005/0099013 A1    May 12, 2005

(30) Foreign Application Priority Data

Sep. 20, 2002    (JP) ............................. 2002-275032

(51) Int. Cl.
  *F01D 7/00*   (2006.01)
  *F03D 7/06*   (2006.01)
  *F03D 7/02*   (2006.01)
(52) U.S. Cl. ........................................ 290/55; 290/54
(58) Field of Classification Search .................. 290/44, 290/55
  See application file for complete search history.

(56) References Cited

U.S. PATENT DOCUMENTS

| | | | | |
|---|---|---|---|---|
| 1,467,699 A | * | 9/1923 | Vinding et al. ............. | 416/226 |
| 4,264,279 A | * | 4/1981 | Dereng .................... | 416/227 A |
| 4,285,636 A | * | 8/1981 | Kato et al. .............. | 416/197 A |
| 4,303,835 A | * | 12/1981 | Bair ............................ | 290/55 |
| 4,976,587 A | * | 12/1990 | Johnston et al. ............ | 416/230 |
| 5,057,696 A | * | 10/1991 | Thomas ........................ | 290/44 |
| 5,198,156 A | * | 3/1993 | Middleton et al. ............ | 261/87 |
| 5,203,672 A | * | 4/1993 | Wolf .......................... | 415/2.1 |
| 5,252,029 A | * | 10/1993 | Barnes ....................... | 416/142 |
| 5,316,443 A | * | 5/1994 | Smith ..................... | 416/197 R |
| 5,332,925 A | * | 7/1994 | Thomas ........................ | 290/44 |

(Continued)

FOREIGN PATENT DOCUMENTS

JP         54-17439        2/1979

(Continued)

OTHER PUBLICATIONS

Reynolds Number, http://scienceworld.wolfram.com/physics/ReynoldsNumber.html.*

*Primary Examiner*—Darren Schuberg
*Assistant Examiner*—Pedro J. Cuevas
(74) *Attorney, Agent, or Firm*—Oblon, Spivak, McClelland, Maier & Neustadt, P.C.

(57) ABSTRACT

A windmill for highly efficient wind power generation is provided by enabling one to efficiently rotate the windmill even in starting or at a low wind speed region by improving a blade of a vertical shaft type windmill of a lift type. In the windmill for wind power generation, a plurality of blades are provided in parallel with a rotating shaft in a face orthogonal to the vertical rotating shaft at constant angles centering on the rotating shaft, wherein the blade is of a blade type having a high lift coefficient at low Reynolds number and a notch portion is formed at a rear edge portion of a lower face of the blade.

7 Claims, 7 Drawing Sheets

U.S. PATENT DOCUMENTS

| | | | |
|---|---|---|---|
| 5,417,548 A * | 5/1995 | Tangler et al. | 416/223 R |
| 5,463,257 A * | 10/1995 | Yea | 290/55 |
| 5,562,420 A * | 10/1996 | Tangler et al. | 416/223 R |
| 5,791,780 A * | 8/1998 | Bakker | 366/317 |
| 6,012,761 A * | 1/2000 | Hellhake et al. | 296/180.1 |
| 6,068,446 A * | 5/2000 | Tangler et al. | 416/223 R |
| 6,081,043 A * | 6/2000 | Robles Akesolo | 290/55 |
| 6,382,921 B1 * | 5/2002 | Selig et al. | 416/243 |
| 6,872,045 B1 * | 3/2005 | Weaver et al. | 415/4.2 |
| 6,974,309 B1 * | 12/2005 | Seki | 416/227 R |
| 6,984,899 B1 * | 1/2006 | Rice | 290/44 |

FOREIGN PATENT DOCUMENTS

| | | |
|---|---|---|
| JP | 54-153944 | 12/1979 |
| JP | 7-12045 | 1/1995 |
| JP | 7-208320 | 8/1995 |
| JP | 11-294313 | 10/1999 |
| JP | 2001-73925 | 3/2001 |
| JP | 2001-132615 | 5/2001 |
| JP | 2002-266748 | 9/2002 |

* cited by examiner

WINDMILL FOR WIND POWER GENERATION

TECHNICAL FIELD

The present invention relates to an improvement in a shape of a blade of a windmill used for wind power generation.

BACKGROUND ART

Generally, in windmills for wind power generation, there are known a horizontal shaft type windmill in which a rotating shaft thereof is made to be horizontal relative to wind as represented by a dutch type windmill and a vertical shaft type windmill in which a rotating shaft thereof is made to be orthogonal relative to wind.

Among them, in vertical shaft type windmills, there are known a drag type windmill in which a windmill is rotated by a drag generated at a blade thereof as in a paddle type, Sabonius type or the like and a lift type in which a windmill is rotated by a lift generated at a blade thereof as in Darrieus type, a gyro mill type or the like. That is, whereas the former rotates the windmill by a drag difference by reducing resistance of the blade directed to the windward, the latter rotates the windmill by the lift generated at the blade (for example, refer to Patent Literature 1 discussed below).

[Patent Literature 1]

JP-A-54-153944

However, in the case of the former of the vertical shaft type (drag type), there poses a problem that when a peripheral speed ratio (blade end speed/wind speed becomes 1, a moment for rotating the windmill more than the peripheral speed ratio is not generated, even when the wind speed is increased, a rotational number more than the wind speed cannot be achieved and a power generation efficiency is poor. Meanwhile, in the case of the latter (lift type), when the peripheral speed ratio is equal to or lager then 1, than aerodynamic property of the windmill is improved and the windmill can be rotated efficiently. However, when the peripheral speed is smaller than 1, the aerodynamic property of the windmill is deteriorated and the moment for rotating the windmill is reduced. Further, there is a drawback that a starting moment is small and starting from a stationary state becomes very difficult.

Figure 7:
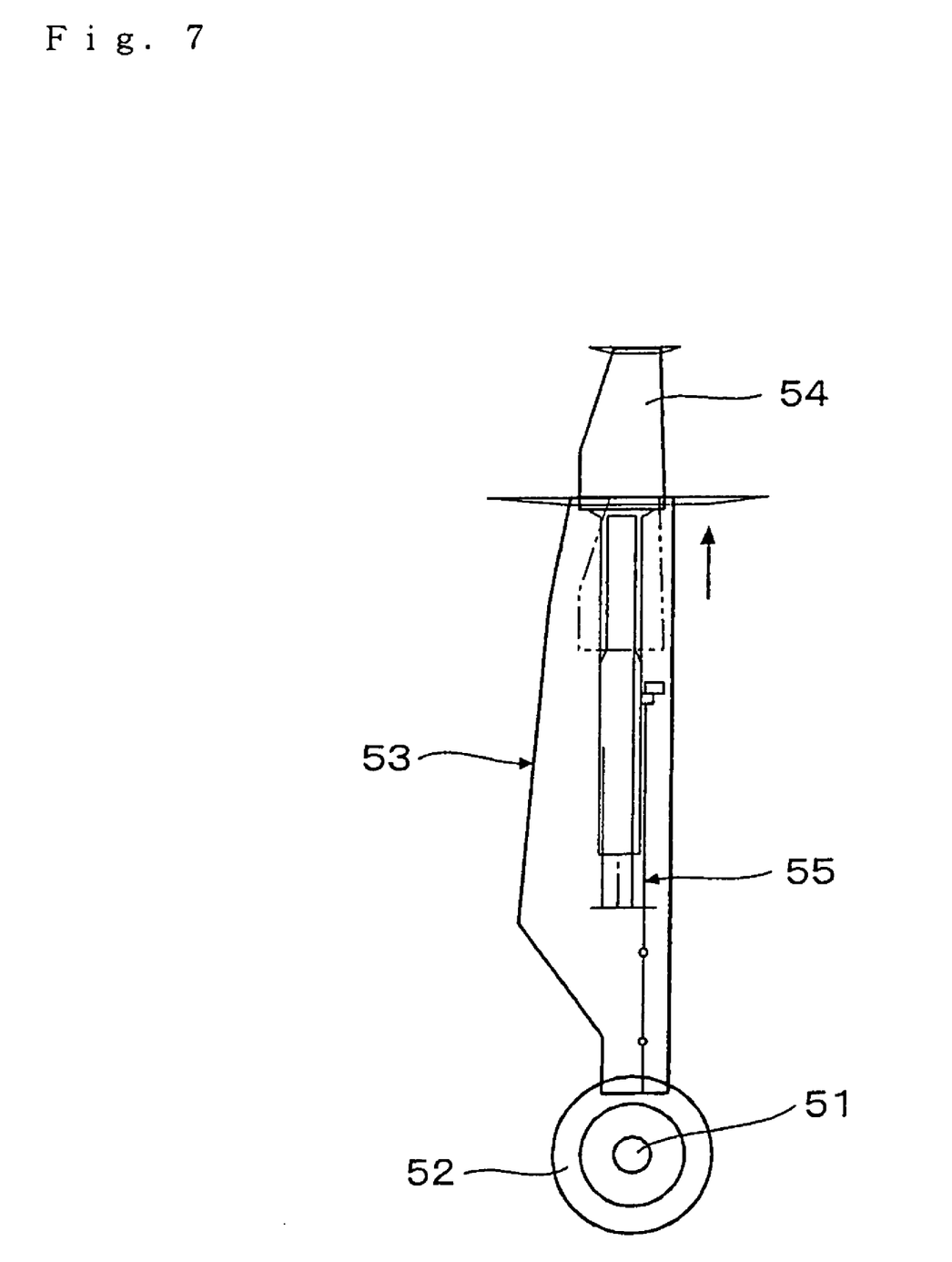
FIG. 7 is a view for explaining a blade structure of a propeller type of a background art.

Hence, there is known, for example, the device shown in Patent Literature 2 (JP-A-2001-132615) or the like which increases the power generation efficiency by improving the shape of the blade. The publication discloses a windmill of the propeller type (lift type) of a horizontal shaft type, as shown by FIG. 7, there is disclosed a constitution in which a plurality of windmill blades 53 are provided at constant angles from a rotating shaft 51 via a rotor 52 in a face orthogonal to the rotating shaft 51, wherein the insides of the respective windmill blades 53 are provided with auxiliary blades 54 included therein extractably and retractably to and from respective front ends thereof, at a low wind speed region, the auxiliary blade 54 is projected from a position designated by two-dotted chain lines at inside of the windmill blade 53 to an upper side of FIG. 7 in an arrow mark direction of FIG. 7 and the rotational torque is increased by increasing the lift.

However, the windmill is a windmill of a horizontal shaft type and there poses a problem that even when the power generation efficiency is increased, a number of parts is increased and the cost is increased. Therefore, there is a drawback that the cost of the apparatus is increased in order to achieve the same power generation function.

Figure 8:
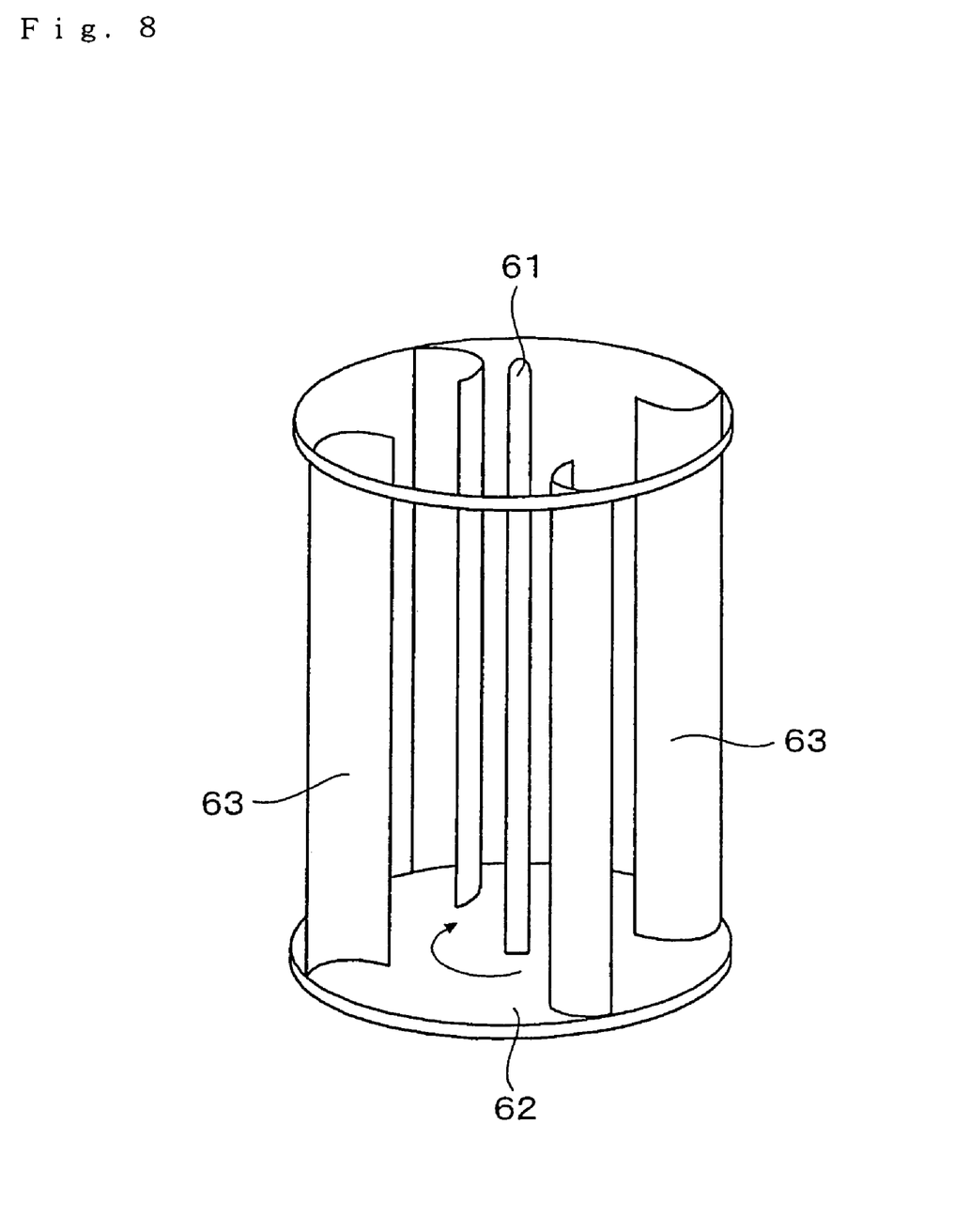
FIG. 8 is a perspective view of a vertical shaft type windmill of a background art.

Incidentally, as shown by FIG. 8, Patent Literature 1 discloses a vertical shaft type windmill in which a rotor shaft 61 is attached with a blade fixing plate 62 and a bent blade 63 is attached to the rotor shaft 61 by an angle of elevation of 0 degrees relative to a rotor shaft 61 between the blade fixing plates 62. However, according to Patent Literature 1, only an example of bending the blade 63 is shown and a specific structure of the blade 63 is not disclosed at all.

DISCLOSURE OF THE INVENTION

Hence, it is object of the invention to provide a windmill for wind power generation having a high power generation efficiency by enabling one to rotate the windmill with an excellent power generation efficiency at a wind speed region of a wide range by improving a shape of a blade of a vertical shaft type windmill.

The above-described object of the invention is achieved by a windmill for wind power generation comprising a plurality of blades at every constant angle centering on a vertical rotating shaft in a face orthogonal to the vertical rotating shaft, wherein the blade is constituted by a blade type having a high lift coefficient at a low Reynolds number and a notch portion is formed at a rear end portion of a lower face of the blade.

Further, the above-described object can effectively be achieved by making the Reynolds number fall in a range of 30,000 through 3,000,000.

Further, the above-described object can effectively be achieved by making the lift coefficient fall in a range of 1.0 through 1.4.

Further, the above-described object can further effectively be achieved by forming the notch portion from a position of 35% through 45% of a chord length from a front edge thereof over to a rear edge thereof.

BEST MODE FOR CARRYING OUT THE INVENTION

An embodiment of the invention will be explained with reference to the drawings as follows.

Figure 1:
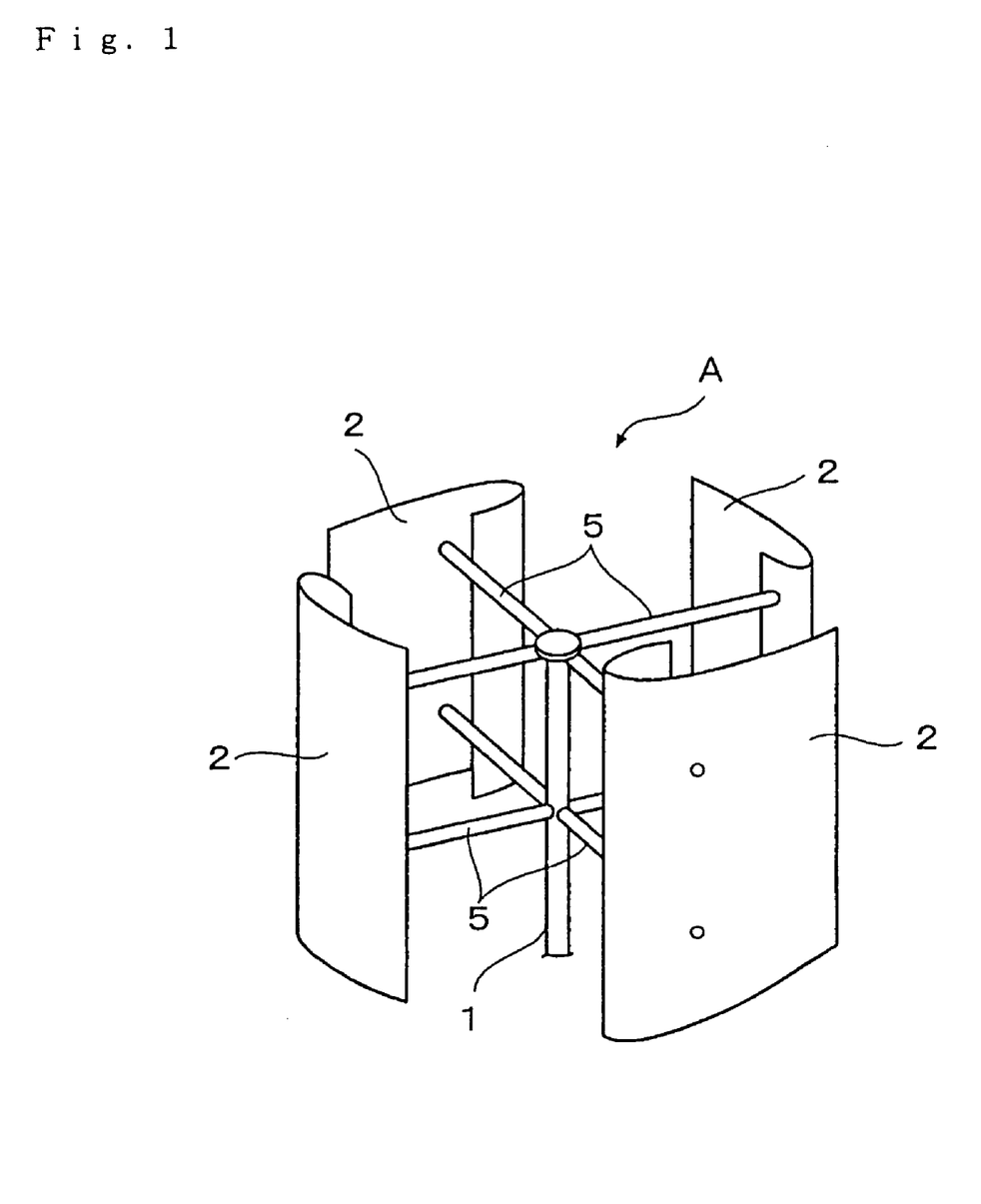
FIG. 1 is a perspective view showing an outlook of a windmill according to the invention.
Figure 2:
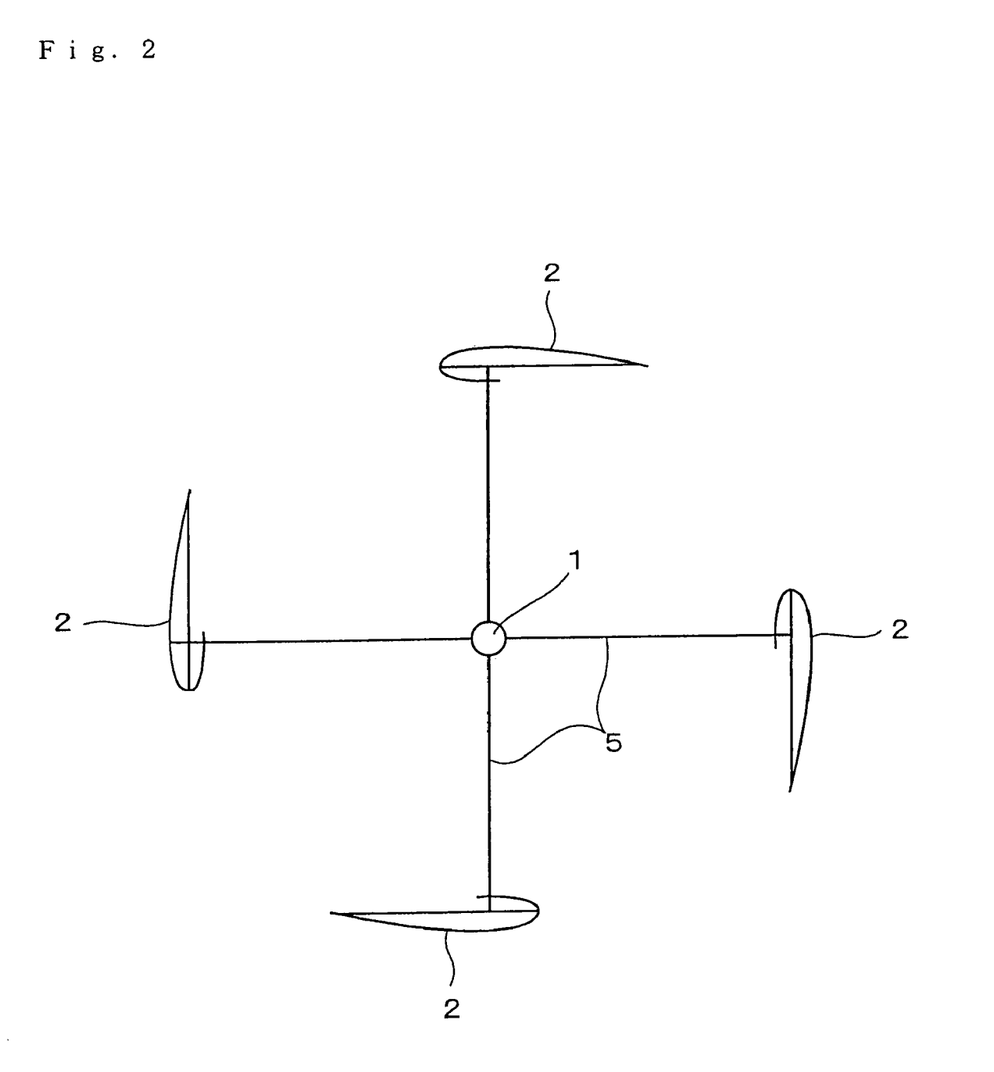
FIG. 2 is a view for explaining arrangement of a blade by viewing the windmill of FIG. 1 from an upper side.
Figure 3:
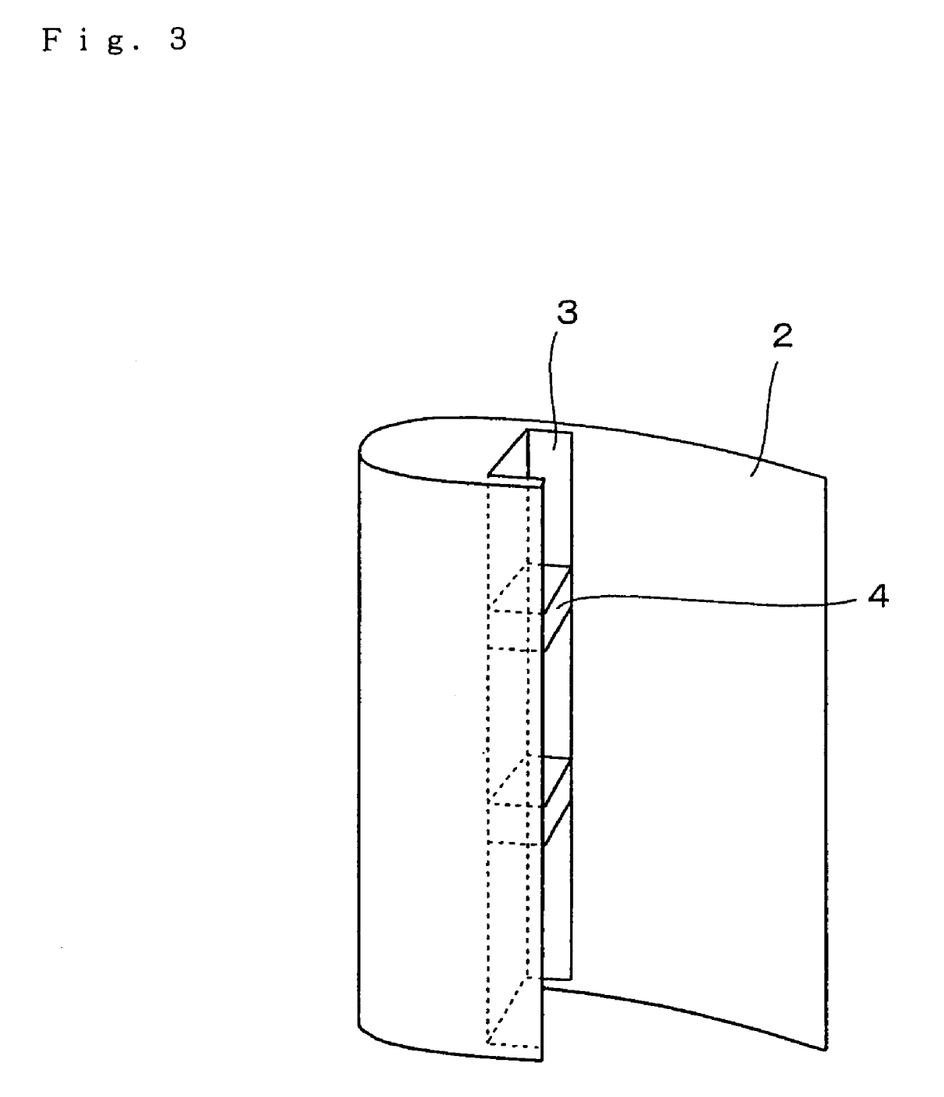
FIG. 3 is a perspective view of the blade shown in FIG. 1.

FIG. 1 shows a windmill A for wind power generation according to an embodiment of the invention. The windmill A is a vertical shaft type windmill for generating power by utilizing a rotational force of the windmill by wind power. As shown by FIG. 1 and FIG. 2, the windmill A is arranged with blades 2,2 . . . of a four sheets blade type comprising an aluminum alloy, plastic including FRP) or the like in parallel with a rotating shaft along a direction of a circumference of the same radius in a face orthogonal to the rotating shaft 1 extended in a vertical direction. As shown by FIG. 3, an outer skin of the blade 2 is formed in a blade type having a streamline shape by bending a material of a thin plate shape comprising a material of an aluminum alloy, plastic (including FRP) in a one sheet structure.

Figure 4:
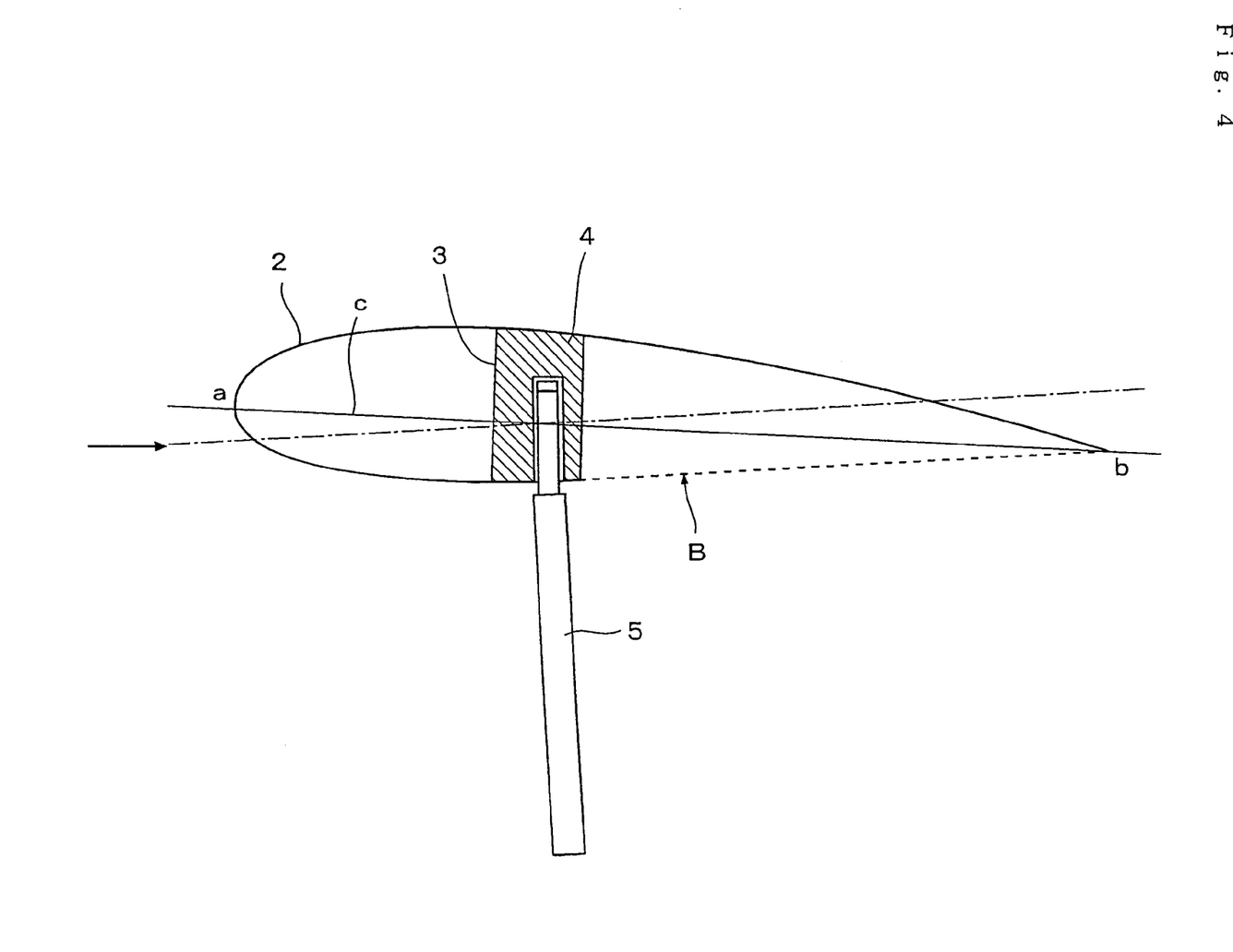
FIG. 4 is a view showing a structure of attaching a support strut to the blade.

Further, as shown by FIG. 3 and FIG. 4, a support beam 3 having a section substantially in a channel-like shape is inserted to fit into the blade 2 and the support beam 3 is attached to upper and lower faces of the blade 2 respectively by rivets or an adhering agent to thereby prevent the blade 2 from being deformed in rotating. The support beam 3 is mounted with a strut support metal piece 4 and an end portion of a support strut 5 extended radially from the rotating shaft 1 is fixed by the strut support metal piece 4. As a result, rotation of the blade 2 is transmitted to the rotating shaft 1 via the support strut 5.

Further, the blade 2 is formed in a blade type having a streamline shape used in an aeroplane represented by a four blade type blade system, an RAF blade type, a Gettingen blade type or the like and a notch portion B is formed at a rear edge portion of a lower face of the blade. The lower face of the blade is notched from a position of between 35% through 45% from a front edge a over to a rear edge b according to the aerodynamic property of the blade. As a result, the blade 2 is formed in a blade type constituting a high lift coefficient at low Reynolds number. Further, as shown by FIG. 4, a chord c of the blade 2 is attached by an angle of 0 degrees through 5 degrees relative to a wind direction to the blade 2 (arrow mark direction of FIG. 4).

Figure 5:
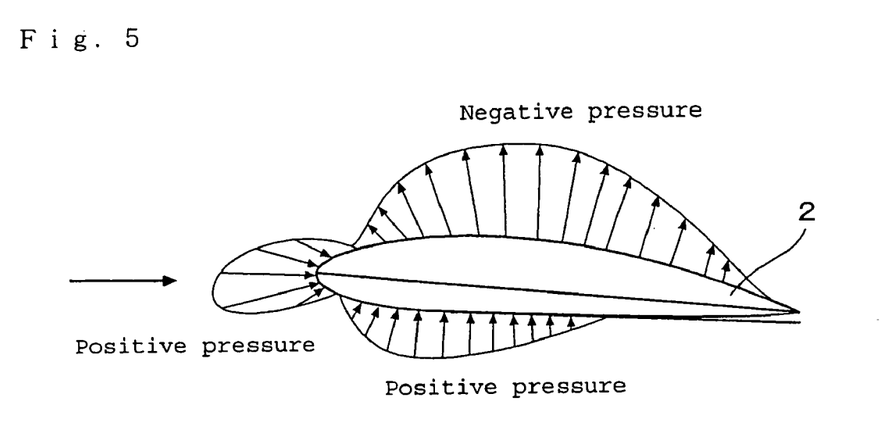
FIG. 5 is a view for explaining a pressure distribution around the blade.

Further, as shown by FIG. 5, a surrounding of the blade 2 is formed with a pressure distribution in correspondence with a wind from a front side (arrow mark direction of FIG. 5). That is, according to the pressure distribution of the blade type used in the blade 2, a pressure higher than an outside atmospheric pressure is distributed to a front portion of the lower face of the blade, a pressure substantially the same as the outside atmospheric pressure is constituted at a rear portion thereof, at an upper face thereof, the flow speed is accelerated by the blade shape at a front end thereof and therefore, the pressure is reduced. Therefore, even when the notch portion B is provided at the rear portion of the lower face of the blade 2, the aerodynamic property of the blade is not considerably influenced thereby.

Figure 6:
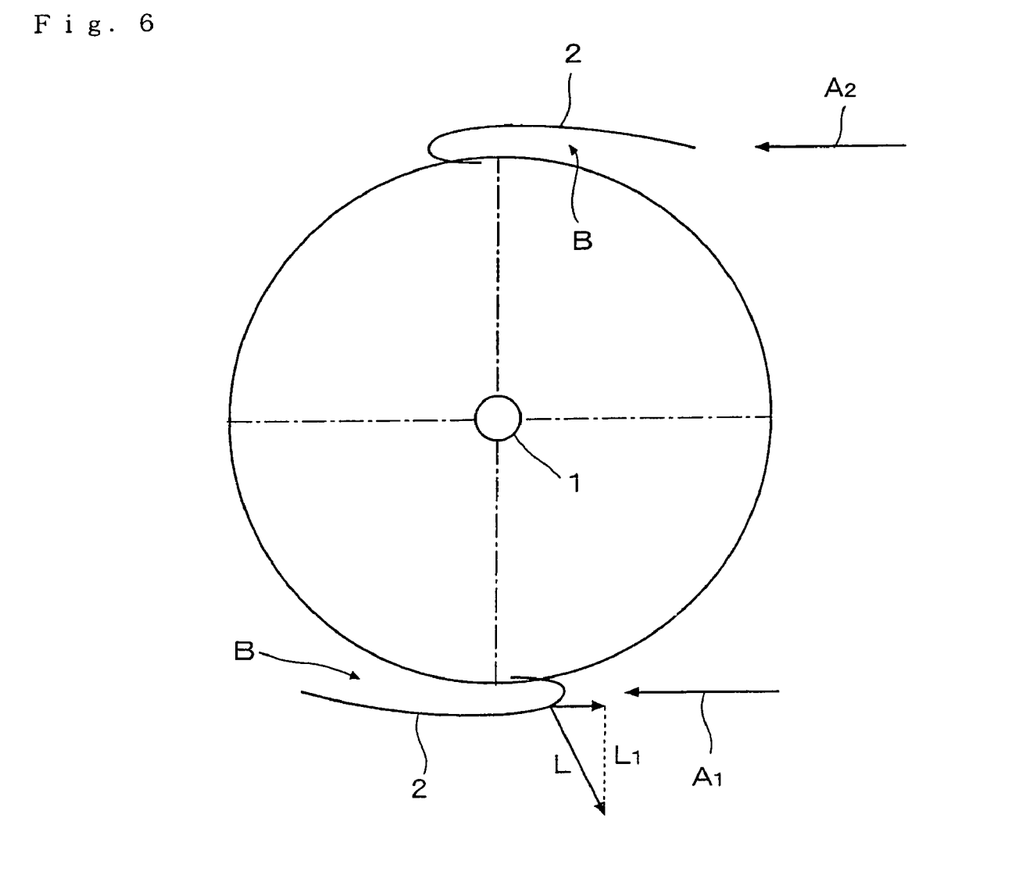
FIG. 6 is a view for explaining rotating operation of the blade.

Therefore, as shown by FIG. 6, when the blade 2 receives a wind from a front side (arrow mark A1 direction of the drawing), a lift is generated in the direction of an arrow mark L in the drawing. Therefore, the windmill is rotated in the counterclockwise direction by a component force in the rotational direction (L1) of the lift generated at the blade 2.

Further, at a low wind speed region as in starting, when the blade 2 is rotated by receiving a wind from a rear side (arrow mark A2 direction of the drawing), a large air resistance is produced at the blade 2 by the notch portion B at the blade lower face of the blade 2. Thereby, a rotational moment is generated at the blade 2 by an Sabonius type windmill effect, that is, by the air resistance to thereby generate a starting torque of the windmill.

As a result, since the blade 2 is formed with the notch portion B at the lower face of the blade, at a low wind speed region in which the peripheral speed ratio is equal to or smaller than 1, the rotational moment is produced by the air resistance with respect to the wind in the arrow mark A2 direction of FIG. 6, the rotational moment is added to the component force in the rotational direction (L1) of the lift generated at the blade 2 receiving the wind from the arrow mark A1 direction of FIG. 6 to rotate the blade and at a high wind speed region in which the peripheral speed ratio is higher than 1, the windmill is rotated by the lift generated at the blade 2. That is, since the blade 2 is formed in the blade type constituting the high lift at low Reynolds number, the blade 2 can be rotated by any wind speed and power can be generated efficiently.

Further, since a light-weighted member of an aluminum alloy or the like is utilized for the blade 2, a weight of a total of the blade 2 is reduced and a load by a centrifugal force generated at the blade 2 is reduced.

Therefore, according to the embodiment, although the notch portion B is formed at the rear edge portion of the blade lower face of the blade 2, since the blade type having the high lift coefficient at low Reynolds number is used, the air resistance and the lift are generated at the blade 2 by wind and the blade 2 is rotated by the forces. Therefore, the rotational moment necessary for power generation can be generated at the blade 2 in any wind direction and at any wind speed. As a result, the blade 2 can be rotated over a wind speed region in a wide range.

Further, according to the windmill A, four sheets of the blades 2 are arranged at the surrounding of the rotating shaft 1, the blade 2 can efficiently be rotated with respect to wind from all the directions and therefore, power can be generated in all the wind directions regardless of the wind directions.

Further, the blade 2 is constituted by a structure of being supported at two upper and lower points thereof by the support struts 5, light-weighted formation of the total of the windmill is facilitated and a compact structure can be constituted. Therefore, the windmill can be provided not only for general household use or office building use but also for a buoy or the like installed on the sea.

Further, although according to the above-described embodiment, four sheets of the blades 2 are arranged at the vertical shaft type windmill, the embodiment is not limited thereto but a plurality of sheets of blades may be used therefor and operation and effect similar to those of the above-described embodiment can be achieved.

Further, the blade 2 can be attached with front end covers for reducing air resistance at the two front ends or can be attached with a winglet for reducing an induced drag of the blade 2 as necessary.

INDUSTRIAL APPLICABILITY

As described above, according to the windmill for wind power generation of the invention, in the windmill for wind power generation comprising the plurality of blades at each of the constant angles centering on the vertical rotating shaft in the face orthogonal to the vertical rotating shaft, the blade is formed by notching the rear edge portion of the lower face of the blade to constitute the blade type in the streamline shape having the high lift coefficient at low Reynolds number. That is, the blade is rotated by air resistance or lift by a component force of the wind and therefore, the blade, namely the windmill, can be rotated with excellent power generation efficiency by effectively combining the property of the drag type windmill and the property of the lift type windmill with respect to wind at any wind speed and in any wind direction, particularly even at a low wind speed region when starting or with weak wind. Further, the vertical shaft type windmill is only provided with the notch portion at a portion of the lower face of the blade and therefore, the windmill is made to be compact by the simple structure, a small-sized or a middle-sized windmill can be fabricated inexpensively and easily and a wide range of modes of utilization such as a buoy installed on the sea or a generator for household use or the like can be realized.

The invention claimed is:

1. A windmill for wind power generation which comprises:
    a windmill for wind power generation comprising a plurality of blades with constant angles centering on a vertical rotating shaft in a face orthogonal to the vertical rotating shaft, wherein the blade is formed in an outer periphery thereof with a bent plate having a streamline shape, has a high lift coefficient at a low Reynolds number and has a notch portion formed therein along a predetermined length between a front edge and a rear edge of the blade.

2. The windmill for wind power generation according to claim 1, wherein the Reynolds number falls in a range of 30,000 through 3,000,000.

3. The windmill for wind power generation according to claim 1, wherein the lift coefficient falls in a range of 1.0 through 1.4.

4. The windmill for wind power generation according to claim 1, wherein the notch portion is formed from a position of 35% through 45% of a chord length of the blade from the front edge thereof over to the rear edge thereof.

5. The windmill for wind power generation according to claim 1, wherein said blade comprises a substantially smooth surfaced plate formed from a sheet of material.

6. The windmill for wind power generation according to claim 5, which comprises a support beam inserted into said blade and a support shaft such that said support beam is rotatably mounted on said support shaft.

7. The windmill for wind power generation according to claim 1, wherein said notch portion comprises a single notch extending alone said predetermined length of the blade.

* * * * *